3,495,005
COMPOSITIONS AND METHODS FOR SUPPRESSING APPETITE WITH COMBINATIONS OF AMPHETAMINE AND THIORIDAZINE
Eugene A. De Felice, Morristown, N.J., assignor to Sandoz-Wander, Inc., Hanover, N.J., a corporation of Delaware
No Drawing. Aug. 2, 1967, Ser. No. 657,757
Int. Cl. A61k 27/00
U.S. Cl. 424—247  8 Claims

ABSTRACT OF THE DISCLOSURE

The invention relates to pharmaceutical compositions having anorexic activity, consisting essentially of amphetamine and thioridazine.

---

The present invention relates to pharmaceutical compositions for the control of appetite, comprising (a) amphetamine (b) thioridazine and/or their salts.

Amphetamine, particularly d-amphetamine sulfate has been used in the control of appetite for a long time. It does, however, have certain side effects related to central nervous system stimulation (e.g. insomnia, tremor, nervousness, jitteriness, etc.) and the cardiovascular system (headache, palpitations, tachycardia, elevation of blood pressure, etc.) so that it cannot be used in certain patients and causes feelings of unpleasantness in others. Thus, for example, it should not be used in patients suffering from anxiety, hyperexcitability or hypertension.

A composition has now been devised in accordance with the present invention which potentiates the anorexic activity of amphetamine and eliminates or minimizes its undesirable side effects.

According to the present invention, there are provided pharmaceutical compositions comprising (a) amphetamine or a pharmaceutically acceptable salt thereof and (b) thioridazine or a pharmaceutically acceptable acid addition salt thereof. Also contemplated are the said compositions in dosage unit form including (c) a pharmaceutically acceptable carrier or diluent.

The thioridazine or salt thereof is preferably present in the composition of the invention in a proportion in the range of from about 1.0 to 4 parts by weight per part by weight of the amphetamine or salt thereof.

The compound thioridazine, also known as 2-methylmercapto-10[2 - (N-methyl - 2 - piperidyl)ethyl]phenothiazine, is a drug well known for its ability to assist in the clinical control of mental disease and it can readily be prepared by techniques familiar to those skilled in the art of preparing organic compounds. This compound is commercially available under the trademark Mellaril. The compound amphetamine and its salts is readily prepared by procedures familiar to those skilled in the art. In a preferred embodiment of this invention d-amphetamine sulfate, which is a freely available item of commerce, is utilized.

The term "pharmaceutically-acceptable acid addition salts" when used herein and in the appended claims in association with thioridazine and amphetamine contemplates those derived from the free bases and organic and inorganic acids. Illustrative of the acids which form pharmaceutically-acceptable addition salts with thioridazine and amphetamine are, for example: hydrochloric, hydrobromic, sulfuric, phosphoric, methane-sulfonic, acetic, lactic, succinic, malic, aconitic, phthalic, tartaric, and the like.

Although thioridazine has no anorexic activity of its own, even when administered in high dosages, it was surprisingly found that the addition of thioridazine to amphetamine potentiates the anorexic activity and increases the weight loss producing properties of amphetamine.

The admixture of a phenothiazine "CNS depressant" as thioridazine (a) with a "CNS stimulant" such as amphetamine (b) might reasonably be expected to lead to a product in which the above noted activities of (a) and (b) would tend to cancel one another. It is also reasonable to expect that, in an appropriate ratio, thioridazine could completely antagonize the CNS stimulant activity of amphetamine. Under this condition, however, it would then be expected that those effects of amphetamine associated with its CNS stimulant activity would also be antagonized. As has been well documented in the art, it is believed that the anorexic effect of amphetamine is inextricably related to its CNS activity. On this basis one would expect that a combination of thioridazine with amphetamine would yield a product in which the anorexic and weight loss effects of amphetamine would be markedly reduced or even abolished.

It was thus completely unexpected to find that thioridazine, which, as stated above, has no anorexic effect of its own, while reducing some of the CNS stimulant activities of amphetamine, not only does not reduce the anorexic activity of amphetamine but actually potentiates this activity and increases the weight loss producing properties.

This is the more surprising when one considers that it is known in the art that phenothiazines generally do not potentiate the anorexic activity of amphetamine. That this is so is clearly borne out by the composition commercially available under the trade name of Eskatrol which consists of the phenothiazine Compazine and d-amphetamine. In this composition the anorexic activity of d-amphetamine is not potentiated by the phenothiazine.

The pharmaceutical compositions in accordance with the invention thus not only represent compositions which substantially diminish or cancel the undesirable activities of amphetamine, thus enabling it to be used in patients in which the use of amphetamine alone is contra-indicated, but actually potentiate the desirable anorexic activity and increases weight loss producing properties.

A further surprising feature of the compositions in accordance with the invention is that the toxicity of the compositions are considerably lower than the theoretical toxicities which were to be expected.

The daily dosages for the compositions of the invention vary between 5 and 30 milligrams per kilogram in small mammals, e.g. primates. (It is known in the art that when the quantities to be administered are expressed in milligrams per kilogram they are considerably less in the case of large mammals than in the case of small mamals.)

While the ratio in which the amphetamine and thioridazine are present may vary as may the amounts of active material contained in the compositions and the number of times that the compositions are administered per day, these factors should be chosen in such a manner that large mammals would receive between 10 and 30 milligrams per day of d-amphetamine. The unit dosages thus preferably contain from about 2.5 to 15 milligrams of amphetamine and from about 2.5 to 60 milligrams of thioridazine, the ratio of amphetamine: thioridazine being from about 1:1 to 1:4.

A particularly useful dosage unit has been found to be one containing 10 milligrams of thioridazine and 5 milligrams of d-amphetamine. In the case of large mammals, e.g. primates, one or two of these units are preferably administered 2 to 3 times daily.

To determine the optimal dose for the individual mammal, the same method used in the administration of d-amphetamine may be followed, namely: start by administering compositions yielding 5 milligrams per day of d-amphetamine and increase amount until desired response is obtained.

To produce dosage units for peroral application, the compositions of this invention may be combined, for example, with solid pharmaceutically acceptable pulverulent carriers such as lactose, saccharose, sorbitol, mannitol; starches such as potato starch, corn starch or amylopectin, also laminaria powder, highly dispersed silicic acid or citrus pulp powder cellulose derivatives or gelatin, also glycerine and lubricants such as magnesium or calcium stearate or polyethylene glycols of suitable molecular weights may be added, to form tablets, presscoated tablets or cores. The latter are coated, for example, with concentrated sugar solutions which can contain, for example, gum arabic, talcum and/or titanium dioxide, or they are coated with a film forming polymer dissolved in easily volatile organic solvents or a mixture of organic solvents. Dyestuffs can be added to these coatings, for example, to distinguish between different contents of active substance.

Hard gelatin capsules contain, for example, powder mixtures or granulates of the instant compositions with solid pulverulent carriers such as, e.g. lactose, saccharose, sorbitol, mannitol, and further starches such as potato starch, corn starch or amylopectin, cellulose derivatives or gelatin, as well as magnesium stearate or stearic acid, and talcum.

Such tablets, presscoated tablets, coated tablets and capsules contain preferably between about 10 and about 150 mg. of the instant compositions, said amounts constituting from 10 to 90% and preferably from about 40 to 80% of the total weight of the tablets, presscoated tablets, coated tablets and capsules, respectively.

The method of treating obese patients by administering the compositions herein described also forms part of the invention.

The following non-limitative examples are given by way of illustrating the compositions of the present invention. All percentages are weight by weight.

EXAMPLE 1

Compressed tablet:
  Thioridazine HCL _____ mg__   10.0
  d-Amphetamine sulfate _____ mg__    5.0
  Lactose (spray dried) _____ percent__  30–50
  Microcrystalline cellulose _____ do____ 15–25
  Corn starch _____ do____ 10–15
  Stearic acid _____ do____  1–2
  Colloidal silica _____ do____ 0.1–0.3

These ingredients are passed through a sieve and the powders are blended until the active ingredients are uniformly dispersed. The blended powder is then compressed into tablets.

EXAMPLE 2

Compressed tablet:
  Thioridazine HCL _____ mg__   10.0
  d-Amphetamine sulfate _____ mg__    5.0
  Terra alba _____ percent__  18–25
  Keltose _____ do____  8–10
  Lactose powder _____ do____ 30–40
  Gelatin _____ do____  .3–.5
  Corn starch _____ do____  9–11
  Sucrose powder _____ do____  3–5
  Stearic acid _____ do____  3–5

These ingredients are passed through a sieve and thoroughly mixed. The blended powder is moistened with the addition of SD #30 alcohol:water (1:1 ratio) and is then granulated through a sieve and dried to a water content of 2–3. The starch and colloidal silica are blended with equal volume of dry granulation. All the material is then passed through a sieve and compressed into tablets.

EXAMPLE 3

Capsule:
  Thioridazine HCl _____ mg__   10.0
  d-Amphetamine sulfate _____ mg__    5.0
  Magnesium stearate _____ percent__   3–5
  Lactose (spray dried or powder) _____   QSAD These ingredients are mixed and introduced in a two-piece hard gelatin capsule.

EXAMPLE 4

Sustained release tablet:
  Thioridazine HCl, d-amphetamine sulfate _____ ratio__   2:1
  Vinyl acetate resin _____ percent__  15–35
  Stearic acid _____ do____  1–10
  Lactose powder _____ do____ 30–50
  F. D. & C. soluble dye _____   QSAD All the ingredients are passed through a sieve and thoroughly mixed. Water is added to moisten and develop the color. This is completed with the addition of S.D. #30 alcohol and blended. The result is granulated through a sieve and dried in a vacuum dryer for 2 hours. This is then passed through a sieve for desired mesh size (14–35 mesh) and then compressed into tablets.

*Note.*—The sustained release tablet may be comprised of 1, 2 or 3 different granulations prepared similarly to the procedure outlined above.

EXAMPLE 5

Oral Liquid:
  Thioridazine HCl _____ mg__   10.0
  d-Amphetamine sulfate _____ mg__    5.0
  Ethyl alcohol _____ percent__  10–20
  Simple syrup _____ do____ 30–50
  Distilled water _____ do____ 30–50
  Flavoring agent _____   QSAD
  Coloring agent _____   QSAD The thioridazine HCl and flavoring agent are dissolved in the ethyl alcohol. The d-amphetamine sulfate and dye are disolved in a portion of the water. The two solutions are then added together and mixed with the simple syrup. The solution is brought to the desired volume with distilled water.

EXAMPLE 6

Sterile solution for injection:
  Thioridazine HCl _____ percent__  10.0
  d-Amphetamine sulfate _____ do____  5.0
  Buffer system _____   QSAD
  Sodium chloride _____   QSAD
  Water for injection, desired volume _____   QSAD The ingredients are dissolved in the water for injection. The resulting solution is then filtered through an appropriate medium to render a clear solution. This solution is then autoclaved to render it sterile.

EXAMPLE 7

Suppository:
  Thioridazine HCl _____ 10.0 mg. or multiples.
  d-Amphetamine sulfate _____ 5.0 mg. of 2:1 ratio.
  Ethanol (denatured) _____ QSAD.
  Theobroma oil _____ QSAD Desired weight.

The theobroma oil is liquefied by heating. The thioridazine HCl, d-amphetamine sulfate and ⅓ of the theobroma oil are mixed together with a mechanical stirrer. The remainder of the theobroma oil is added and the mixture blended until uniform. It is then passed through a sieve. The mixture is automatically filled into molds lubricated with SD #30 alcohol at −20° C.

What is claimed is:

1. A pharmaceutical composition having enhanced anoretic activity comprising in admixture a pharmaceutically acceptable carrier and
   (a) amphetamine or a pharmaceutically acceptable acid addition salt thereof, and
   (b) thioridazine or a pharmaceutically acceptable acid addition salt thereof, said (b) being present in an amount calculated as the free base of from about 1 to about 4 parts by weight per part of (a) calculated as the free base.

2. A composition of claim 1 wherein the weight ratio of (b) to (a) is 2:1.

3. A composition of claim 1 wherein (a) is d-amphetamine sulfate.

4. A composition of claim 1 wherein (b) is thioridazine hydrochloride.

5. A composition of claim 1 wherein (a) and (b) are present in an amount sufficient to provide a daily dosage from about 10 milligrams to about 30 milligrams and from about 10 milligrams to about 120 milligrams of d-amphetamine and thioridazine, respectively.

6. A composition of claim 1 containing from about 2.5 to about 15 milligrams of d-amphetamine and from about 2.5 to about 60 milligrams of thioridazine.

7. A method for suppressing appetite in a patient which comprises administering to said patient an effective amount of a composition comprising amphetamine or a pharmaceutically acceptable acid addition salt thereof and from 1 part to about 4 parts by weight of thioridazine or a pharmaceutically acceptable acid addition salt thereof calculated as the free base per part of amphetamine.

8. The method of claim 7 wherein the amounts of thioridazine and amphetamine administered per day are from about 10 to about 30 milligrams and from about 10 to about 120 milligrams, respectively.

References Cited

S. K. and F. Bulletin on Eskatrol. pp. 1–4 (September 1965).

Sandox Bulletin on Melloril pp. 1–7 (Dec. 1, 1964).

Proctor, et al. C. A., vol. 65, p. 20, 699 H (1966).

ALBERT T. MEYERS, Primary Examiner

S. J. FRIEDMAN, Assistant Examiner

U.S. Cl. X.R.

424—330